United States Patent
Kawato et al.

(10) Patent No.: US 7,031,814 B2
(45) Date of Patent: Apr. 18, 2006

(54) OCCUPANT PROTECTION APPARATUS FOR VEHICLE

(75) Inventors: Takashi Kawato, Anjo (JP); Koji Aoki, Nagoya (JP); Koichi Hirota, Takahama (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/157,818

(22) Filed: Jun. 22, 2005

(65) Prior Publication Data

US 2005/0283292 A1      Dec. 22, 2005

(30) Foreign Application Priority Data

Jun. 22, 2004   (JP)   .............................. 2004-184144

(51) Int. Cl.
B60R 21/32      (2006.01)
(52) U.S. Cl. .................. 701/45; 280/735; 280/801.1; 701/48; 180/268
(58) Field of Classification Search ................. 701/45, 701/46, 48, 301; 180/268, 271, 273; 280/735, 280/801.1, 736
See application file for complete search history.

(56) References Cited

U.S. PATENT DOCUMENTS

| | | | |
|---|---|---|---|
| 6,253,133 B1 * | 6/2001 | Sakai et al. | 701/45 |
| 6,333,686 B1 * | 12/2001 | Waltzer | 340/438 |
| 6,792,342 B1 * | 9/2004 | Breed et al. | 701/45 |
| 6,832,145 B1 * | 12/2004 | Takafuji et al. | 701/45 |
| 6,833,516 B1 * | 12/2004 | Breed et al. | 177/144 |
| 6,843,339 B1 * | 1/2005 | Midorikawa et al. | 180/268 |
| 6,856,873 B1 * | 2/2005 | Breed et al. | 701/45 |

FOREIGN PATENT DOCUMENTS

| | | |
|---|---|---|
| JP | 10-309967 | 11/1998 |
| JP | 11-334437 | 12/1999 |

* cited by examiner

*Primary Examiner*—Richard M. Camby
(74) *Attorney, Agent, or Firm*—Sughrue Mion, PLLC (57) ABSTRACT

An occupant protection apparatus for a vehicle includes a first power source means, a second power source means for supplying power of higher voltage than that of the first power source means, a collision-predicting means for predicting a collision, a driving means for driving an actuation mechanism of the vehicle on the basis of an output from the collision-predicting means, and a switching means for switching over from the first power source means to the second power source means for supplying power to the driving means when a collision is predicted to occur by the collision-predicting means.

20 Claims, 3 Drawing Sheets

OCCUPANT PROTECTION APPARATUS FOR VEHICLE

CROSS REFERENCE TO RELATED APPLICATIONS

This application is based on and claims priority under 35 U.S.C. § 119 to Japanese Patent Application 2004-184144, filed on Jun. 22, 2004, the entire content of which is incorporated herein by reference.

FIELD OF THE INVENTION

This invention generally relates to an occupant protection apparatus for a vehicle. More particularly, this invention pertains to an occupant protection apparatus for a vehicle in which a collision prediction using a radar is performed, and an action for protection of the occupant is performed on the basis of an output of the collision prediction.

BACKGROUND

In a vehicle such as an automobile, in a condition that a seat back of a seat is reclined or stand upright in an excessive level in case that a vehicle collides, there is a danger that an occupant of the vehicle can not preferably be protected by means of a seat belt and an air bag, or the like. JPH11-334437A describes a conventional occupant protection apparatus designed to overcome the problem described above. The conventional occupant protection apparatus includes a prediction sensor for predicting a collision of the vehicle with an object approaching from backward of the vehicle, a reclining sensor for detecting a reclining angle of a seat back, a control means for actuating a seat belt pretensioner when a collision is predicted by the prediction sensor, and a seat back-angle control means for changing the reclining angle of the seat back into a predetermined range when the reclining angle of the seat back is out of the predetermined range on the basis of a detection output of the reclining sensor.

As described above, when the seat back, or the like, is moved to an appropriate position for protecting an occupant when a collision of the vehicle is predicted, because there are cases that time is very short from when the collision of the vehicle is predicted to when the vehicle actually collides, the seat back or the like need to be moved at high speed. However, because a voltage of a power source utilized when the collision is predicted is the same one as utilized in a normal state, the seat back cannot be moved at a high speed. In addition, because of an action of the seat back or the like performed when a vehicle collision is predicted, a voltage of the power source can be made lower, and thus there can be a danger that a sufficient power can not be supplied to another part of the vehicle because of this voltage lowering of the power source.

A need thus exists for an occupant protection apparatus for a vehicle enabling an action of some part of a vehicle such as a seat or a window performed when a collision of the vehicle is predicted. It is preferable that a sufficient power can be supplied to another part of the vehicle even in the case described above. The present invention has been made in view of the above circumstances and provides such an occupant protection apparatus for a vehicle.

SUMMARY OF THE INVENTION

According to an aspect of the present invention, an occupant protection apparatus for a vehicle includes a first power source means, a second power source means for supplying power of higher voltage than that of the first power source means, a collision-predicting means for predicting a collision, a driving means for driving an actuation mechanism of the vehicle on the basis of an output from the collision-predicting means, and a switching means for switching over from the first power source means to the second power source means for supplying power to the driving means when a collision is predicted to occur by the collision-predicting means.

According to a further aspect of the present invention, an occupant protection apparatus for a vehicle includes a first power source means, a second power source means for supplying power of higher voltage than that of the first power source means, an operation-inputting means provided so as to be operable by an occupant, a collision-predicting means for predicting a collision, a driving means for driving an actuation mechanism of the vehicle on the basis of either one of an output from the operation-inputting means and an output from the collision-predicting means, and a switching means for selecting the first power source means to supply power to the driving means when an action command is input from the operation-inputting means and for switching over from the first power source means to the second power source means to supply power to the driving means when a collision is predicted to occur by the collision-predicting means.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
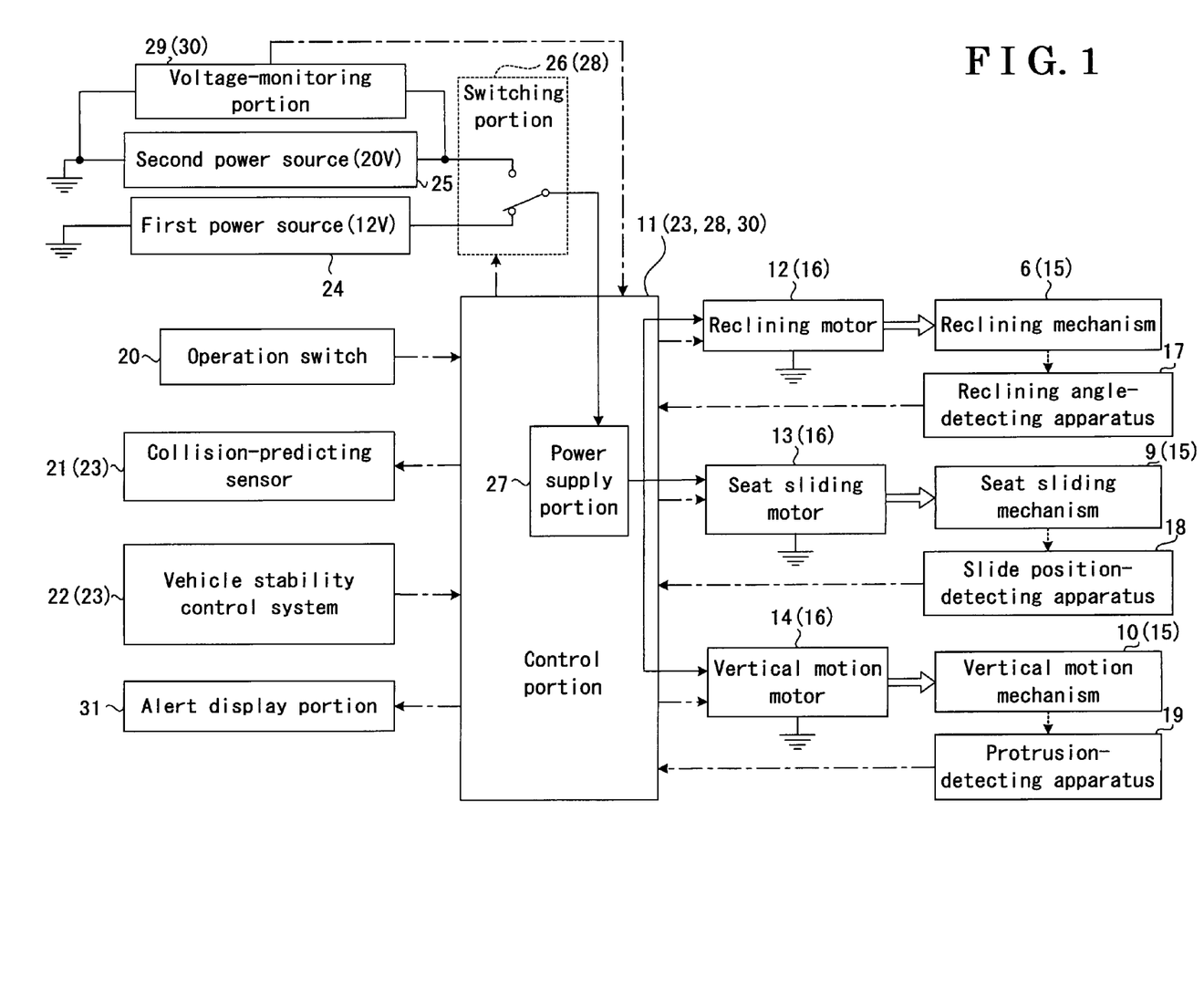
FIG. 1 represents a block diagram illustrating controls of an occupant protection apparatus according to an embodiment of the present invention.
Figure 2:
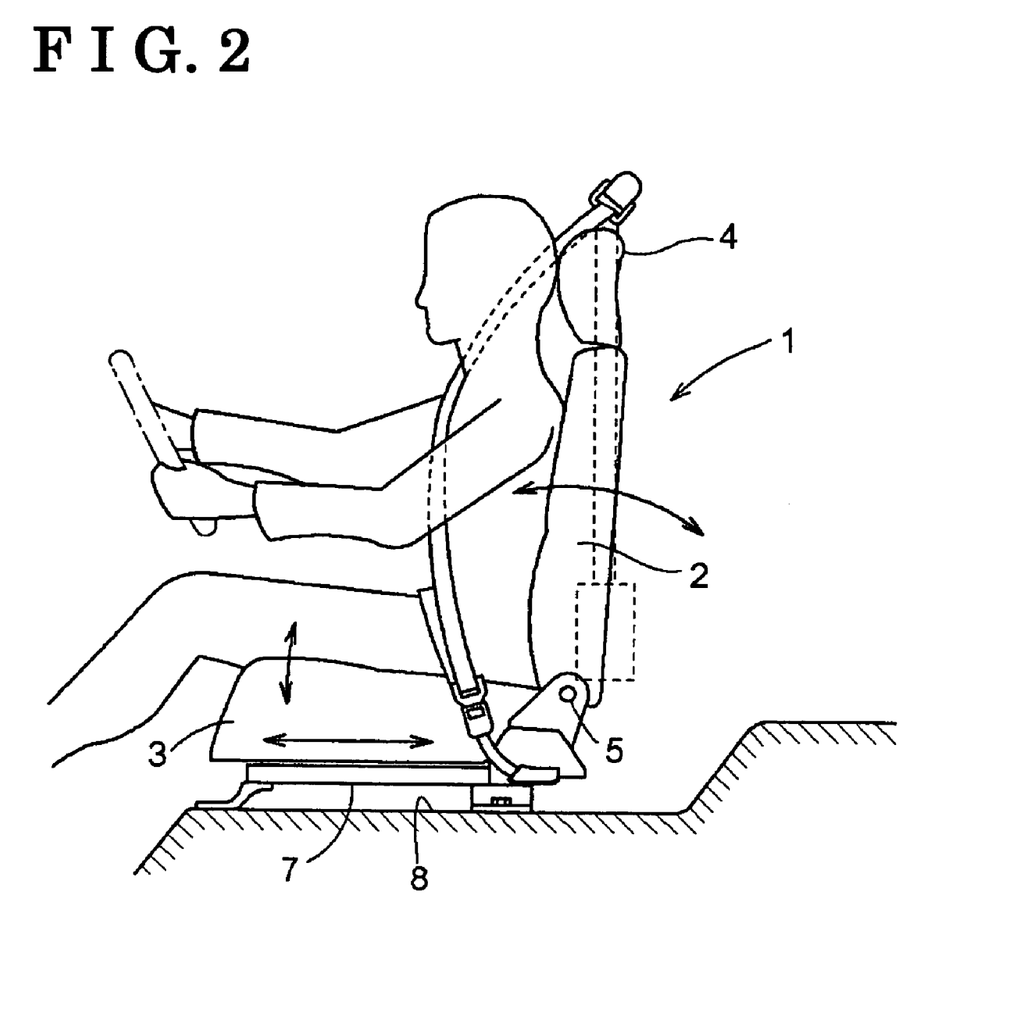
FIG. 2 represents a diagram illustrating a seat, which is an object to be actuated in an operation of the occupant protection apparatus according to the embodiment of the present invention.

An occupant protection apparatus for a vehicle according to an embodiment of the present invention will be explained with reference to drawing figures. In this embodiment, for simplifying explanation, objects to be actuated in an operation of the occupant protection apparatus will be reclining, sliding, and vertical movement of a seat 1. FIG. 1 represents a block diagram illustrating a control performed by the occupant protection apparatus according to the embodiment of the present invention. FIG. 2 represents a diagram illustrating the seat 1 serving as an object to be actuated in an operation of the occupant protection apparatus according to the embodiment.

According to the embodiment, the seat 1 includes a seat back 2, a seat cushion 3, and a headrest 4. The seat back 2 is attached to the seat cushion 3 and supported by a certain supporting point 5 of the seat cushion 3. A reclining angle of the seat back 2 is changeable by means of a reclining mechanism 6. The seat cushion 3 is attached to a floor of the vehicle through a slide rail 7. The seat cushion 3 is slidable in a fore-aft direction by means of a seat sliding mechanism 9. Further, a vertical motion mechanism 10 is provided at a front portion of the seat cushion 3. The level of the protrusion of a front portion of the seat cushion 3 is changeable in a vertical direction.

Then, the reclining mechanism 6 is configured to change the reclining angle of the seat back 2 by means of a reclining motor 12 operated on the basis of a control signal input from a control portion 11. The seat sliding mechanism 9 is configured to slide the seat cushion 3 in a fore-aft direction by means of a seat sliding motor 13 operated on the basis of a control signal input from the control portion 11. Thus, the seat 1 is slid in a fore-aft direction also. Further, a vertical motion mechanism 10 is configured to move the front portion of the seat cushion 3 in a vertical direction by means of a vertical motion motor 14 operated by a control signal input from the control portion 11. Accordingly, in the embodiment, the reclining mechanism 6, the seat sliding mechanism 9, and the vertical motion mechanism 10 are serving as actuation mechanisms 15. In addition, in the embodiment, the reclining motor 12 for driving the reclining mechanism 6, the seat sliding motor 13 for driving the seat sliding mechanism 9, and the vertical motion motor 14 for driving the vertical motion mechanism 10 are serving as driving means 16.

Further, a reclining angle-detecting apparatus 17 for detecting a reclining angle of the seat back 2 is provided at the reclining mechanism 6. A slide position-detecting apparatus 18 for detecting a sliding position of the seat 1 in a fore-aft direction is provided at the seat sliding mechanism 9. A protrusion-detecting apparatus 19 for detecting a level of protrusion of the front portion of the seat cushion 3 in a vertical direction is provided at the vertical motion mechanism 10. As the reclining angle-detecting apparatus 17, the slide position-detecting apparatus 18, and the protrusion-detecting apparatus 19, for example, an angle gauge such as a potentiometer and a rotary encoder, and a length gauge such as a linear potentiometer and a linear encoder can be utilized.

In addition, the seat 1 includes an operation switch 20 for operating the reclining mechanism 6, the seat sliding mechanism 9, and the vertical motion mechanism 10 designed to adjust the seat 1 to a position desired by the occupant. In FIG. 1, the operation switch 20 is indicated by a box. However, it is preferable that one switch is provided for each mechanism. Then, when the operation switch 20 is operated, an operation signal corresponding to a level of operation and an operation time of the operation switch 20 is input to the control portion 11 as an action command. A drive control signal is transmitted to the reclining motor 12, the seat sliding motor 13, and the vertical motion motor 14 by the control portion 11 on the basis of the operation signal. Then, the reclining mechanism 6, the seat sliding mechanism 9, and the vertical motion mechanism 10 are actuated. Accordingly, in the embodiment, the operating switch 20 is serving as an operation-inputting means.

In addition, according to the embodiment, the occupant protection apparatus includes a collision-predicting sensor 21 and a vehicle stability control system 22. The collision-predicting sensor 21 is configured from a millimeter wave radar or a graphical recognition apparatus, both designed for detecting an obstacle present around the vehicle, or the like. Then, an output signal emitted by the collision-predicting sensor 21 is transmitted to the control portion 11. In the control portion 11, a distance from an obstacle, a relative velocity to the obstacle, or the like, are calculated on the basis of the output signal emitted by the collision-predicting sensor 21. Then, on the basis of information of the calculation, probability of a collision of the vehicle with the obstacle is judged on the basis of predetermined judging conditions. On the other hand, by means of the vehicle stability control system 22, side-slips of front wheels and rear wheels are detected by a sensor or the like, and braking action for each wheels and an engine output is controlled for ensuring a stability of the vehicle. When the vehicle stability control system 22 is operated, it is judged that there is a probability of a collision of the vehicle with the obstacle. Then, a signal is transmitted from the vehicle stability control system 22 to the control portion 11 corresponding to the operation state of the vehicle stability control system 22. Then, in the control portion 11, on the basis of the output signal transmitted from the vehicle stability control system 22, a probability of a collision is judged on the basis of predetermined judging conditions. Accordingly, in the embodiment, the collision-predicting sensor 21, the vehicle stability control system 22, and the control portion 11 for judging a probability of a collision of the vehicle on the basis of the output signal are serving as a collision-predicting means 23.

Then, when it is judged that a collision is unavoidable with a predetermined probability or higher on the basis of one or both of the outputs emitted from the collision-predicting sensor 21 and the vehicle stability control system 22, the control portion 11 sets a collision predicted state. In this time, in the control system 11, a predicted collision time when the vehicle will collide is calculated on the basis of one or both of the outputs emitted from the collision-predicting sensor 21 and the vehicle stability control system 22. The predicted collision time is calculated on the basis of the distance from the obstacle, the relative velocity to the obstacle, both calculated on the basis of the output signal emitted from the collision-predicting sensor 21, or the like. Then, when the collision predicted state is set, the control portion 11 emits drive control signals to the reclining motor 12, the seat sliding motor 13, and the vertical motion motor 14 for actuating the reclining mechanism 6, the seat sliding mechanism 9, and the vertical motion mechanism 10 respectively. In this time, the reclining mechanism 6, the seat sliding mechanism 9, and the vertical motion mechanism 10 need to be operated so as to complete their actions by the predicted collision time.

In addition, according to the embodiment, the occupant protection apparatus includes a first power source 24 and a second power source 25. Here, the second power source 25 can supply higher voltage than that supplied from the first power source 24. In the embodiment, as a specific example, a voltage of the first power source 24 is set to 12V, and a voltage of the second power source 25 is set to 20V. Then, in a normal state, in other words, not being in the collision predicted state, power supplied from the first power source 24 is utilized for actuating the reclining mechanism 6, the seat sliding mechanism 9, and the vertical motion mechanism 10 on the basis of an operation signal transmitted from the operation switch 20. On the other hand, when the control portion 11 judges that a collision is unavoidable, in other words, in the collision predicted state, power supplied from the second power source 25 is utilized for actuating the reclining mechanism 6, the seat sliding mechanism 9, and the vertical motion mechanism 10 at a higher speed than that in the normal state. It is because that, in the collision predicted state, each actuation mechanism 15 need to be completely actuated during a time from when a collision is predicted to the collision predicted time. Power is supplied from the first power source 24 or the second power source 25 to the reclining motor 12, the seat sliding motor 13, and the vertical motion motor 14 through a switching portion 26 described later and a power supply portion 27 provided at the control portion 11. Accordingly, in the embodiment, the first power source 24 is serving as a first power source means, and the second power source 25 is serving as a second power source means. In addition, though not illustrated in FIG. 1, the first power source 24 and the second power source 25 can be configured to supply power to another part of the vehicle other than the occupant protection apparatus.

In addition, according to the embodiment, the occupant protection apparatus further includes the switching portion 26 for switching a power source circuit to supply power from the first power source 24 or the second power source 25 to the reclining motor 12, the seat sliding motor 13, and the vertical motion motor 14. When an operation signal of an action command is transmitted from the operation switch 20, the switching portion 26 is switched to supply power from the first power source 24 to the reclining motor 12, the seat sliding motor 13, and the vertical motion motor 14 through the power supply portion 27. On the other hand, when the control portion 11 becomes the collision predicted state, if power is supplied from the first power source 24 to the reclining motor 12, the seat sliding motor 13, and the vertical motion motor 14, the switching portion 26 is switched to supply power from the second power source 25 to the driving means 16. In this time, the circuit is switched by the switching portion 26 on the basis of a control signal transmitted from the control portion 11. Accordingly, the switching portion 26 can be preferably configured from a relay, or the like. In the embodiment, the switching portion 26 and the control portion 11 for controlling the switching portion 26 are serving as a switching means 28.

Thus, in the normal state, in other words, not in the collision predicted state, when the operation signal of the action command is transmitted from the operation switch 20, power of appropriate voltage is supplied from the first power source 24 to the reclining motor 12, the seat sliding motor 13, and the vertical motion motor 14. As a result, the reclining mechanism 6, the seat sliding mechanism 9, and the vertical motion mechanism 10 can be actuated at an appropriate speed according to the action command from the operation switch 20. In addition, when the control portion 11 becomes the collision predicted state, power of higher voltage than that in the normal state is supplied from the second power source 25 to the reclining motor 12, the seat sliding motor 13, and the vertical motion motor 14. As a result, the reclining mechanism 6, the seat sliding mechanism 9, and the vertical motion mechanism 10 can be actuated at a higher speed than that in the normal state. Accordingly, actions of the reclining mechanism 6 the seat sliding mechanism 9, and the vertical motion mechanism 10 can be completed in a short time, that is, from when a collision is predicted to the collision predicted time. In addition, even when the voltage of the power source is made lower because a plurality of motors are actuated in such a short time, power of sufficient voltage can be also supplied to another part of the vehicle.

In the embodiment, the occupant protection apparatus further includes a voltage-monitoring portion 29 for monitoring the voltage of the second power source 25. In this case, the voltage-monitoring portion 29 is configured from a voltmeter. Then, the voltage-monitoring portion 29 emits a signal indicating a voltage value of the second power source 25 to the control portion 11. In the control portion 11, the voltage of the second power source 25 is detected on the basis of the signal emitted by the voltage monitor portion 29, and it is judged whether the voltage of the second power source 25 is normal or abnormal on the basis of a predetermined condition. Here, a condition for judging whether the voltage of the second power source 25 is normal or abnormal is as follows for example: when a practical voltage of the second power source 25 is within a range between ±5V from a designed voltage of the second power source 20V, the voltage of the second power source 25 is judged to be normal; and when the voltage is out of the range described above, the voltage of the second power source 25 is judged to be abnormal. Accordingly, in the embodiment, the voltage-monitoring portion 29 and the control portion 11 for detecting whether the voltage of the second power source 25 is normal or abnormal on the basis of the output signal of the voltage-monitoring portion 29 are serving as a monitor means 30. Then, when the voltage of the second power source 25 is detected to be abnormal, in other words, the control means 11 judges that the voltage of the second power source 25 is abnormal, the control means 11 prohibits the switching portion 26 from switching the circuit to the second power source 25, and maintaining the switching portion 26 to supply power from the first power source 24 to the reclining motor 12, the seat sliding motor 13, and the vertical motion motor 14. Further, when the voltage of the second power source 25 is detected to be abnormal, the control portion 11 exhibits an abnormality of the second power source 25 on an alert display portion 31. It is preferable that the alert display portion 31 be provided at a position visually seen from the occupant seated on a driver seat. In the embodiment, the alert display portion 31 is serving as a warning means.

As described above, by monitoring the voltage of the second power source 25 and by prohibiting the switching portion 26 from switching the circuit to the second power source 25 when the voltage of the second power source 25 is abnormal, in the collision predicted state, the switching portion 26 is prohibited from switching the circuit to the second power source 25 of an abnormal condition. Therefore, the reclining motor 12, the seat sliding motor 13, and the vertical motion motor 14 are actuated by power supplied from the first power source 24 at a slower speed, but can be actuated firmly. Further, because the alert is exhibited on the alert display portion 31, even when the second power source 25 is designed for use only in the collision predicted state, in other words, designed not to be utilized in the normal state, the occupant can be acquainted with an abnormality of the second power source 25.

Figure 3:
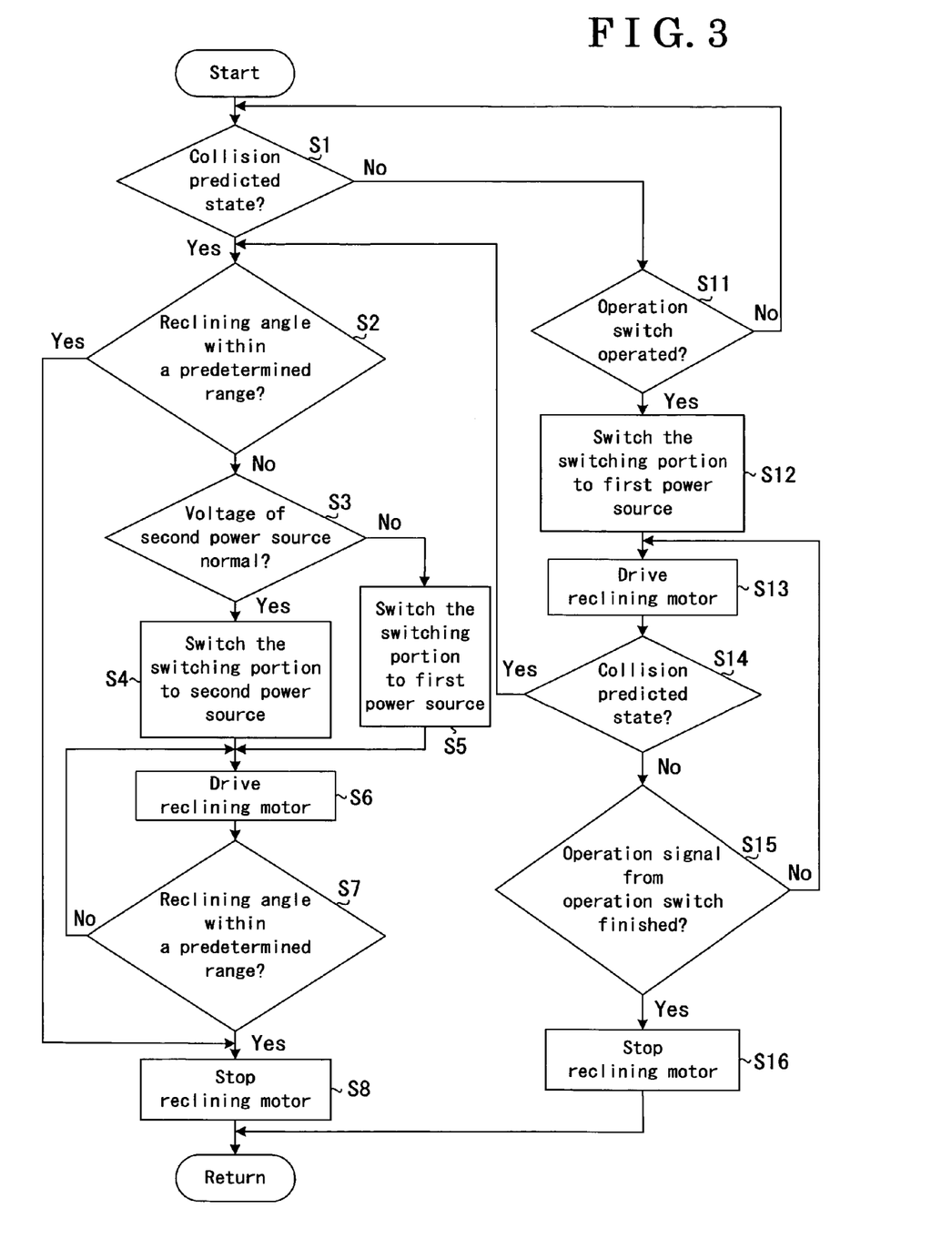
FIG. 3 represents a flow chart illustrating an action control for a reclining mechanism of the seat performed by the occupant protection apparatus according to the embodiment of the present invention.

Next, an action control of the occupant protection apparatus according to the embodiment of the present invention will be explained in detail with reference to a flow chart illustrated in FIG. 3. FIG. 3 represents a flow chart illustrating an action control of the reclining mechanism 6.

As illustrated in the figure, at first, the control portion 11 judges a probability of a collision on the basis of one or both outputs emitted from the collision-predicting sensor 21 and the vehicle stability control system 22. When the control portion 11 judges that a collision is unavoidable with a predetermined probability or higher, the control portion 11 sets the collision predicted state (Step S1). Then, when the collision predicted state is set (Step S1: Yes), the control portion 11 judges whether the reclining angle of the seat back 2 is within a predetermined range or not (Step 2). This judgment is performed by the control portion 11 on the basis of the output from the reclining angle-detecting apparatus 17. Here, the predetermined range of the reclining angle is determined on the basis of a range of the reclining angle appropriate for protecting the occupant in case of a collision. Specifically, the predetermined range of the reclining angle is determined on the basis of a reclining angle appropriate for protecting the occupant by means of a safeguard such as a seat belt and an air bag. When the reclining angle is within the predetermined range (Step S2: Yes), a process proceeds to step S8.

On the other hand, when the reclining angle is not within the predetermined range (Step S2: No), it is judged whether the voltage of the second power source is normal or not (Step S3). This judgment is performed by the control portion 11 on the basis of a signal emitted from the voltage-monitoring portion 29. Then, when the voltage of the second power source 25 is normal (Step S3: Yes), the switching portion 26 is switched to the second power source 25. When the voltage of the second power source 25 is abnormal (Step S3: No), the switching portion 26 is switched to the first power source 24. In this time, if the switching portion 26 is already set to the power source to be switched to, the switching portion 26 is maintained to the set state.

Next, the control portion 11 emits a drive control signal to the reclining motor 12 for actuating the reclining mechanism 6 with use of power supplied from the second power source 25 when the voltage of the second power source 25 is normal (S4, S6). When the voltage of the second power source 25 is abnormal, the first power source 24 is utilized alternately (S5, S6). Then, the reclining motor 12 is driven until the reclining angle becomes within the predetermined range (Step S7). The reclining motor 12 is stopped when the reclining angle becomes within the predetermined angle (Step S8). After that, the process returns to the Step S1.

On the other hand, when the control portion 11 is not in the collision predicted state (Step S1: No), the control portion 11 judges whether the operation switch 20 is operated or not (Step S11). When the operation switch 20 is not operated (Step S11: No), the process returns to the Step S1. When the operation switch 20 is operated (Step S11: Yes), the switching portion 26 is switched to the first power source 24. In this time, if the switching portion 26 is already set to the first power source 24, the switching portion 26 maintains the set state. Next, the control portion 11 emits a drive control signal to the reclining motor 12 for actuating the reclining mechanism 6 with use of power supplied from the first power source 24 (Step S13). While the reclining motor 12 is driven, the control portion 11 judges a probability of a collision on the basis of one or both of outputs emitted from the collision-predicting sensor 21 and the vehicle stability control system 22. When the control portion 11 judges that a collision is unavoidable with a predetermined probability or higher, the control portion 11 sets the collision predicted state (Step S14). When the collision predicted state is set (Step S14: Yes), the process proceeds to Step S2. When the collision predicted state is not set (Step S14: No), the control portion 11 actuates the reclining motor 12 until the operation signal transmitted from the operation switch 20 finishes (Step S15). When the operation signal transmitted from the operation switch 20 finishes, the reclining motor 12 is stopped (Step S16). After that, the process returns to the step S1.

Though not shown in figures, an action control of the seat sliding mechanism 9 and the vertical motion mechanism 10 can also be performed similarly as in the action control of the reclining mechanism 6 illustrated in FIG. 3. In this time, each step can be applied to an action control of the seat sliding mechanism 9 by replacing the "reclining angle" with the "seat slide position", and by replacing the "reclining motor" with the "seat sliding motor". Further, each step illustrated in FIG. 3 can be applied to an action control of the vertical motion mechanism 10 by replacing the "reclining angle" with "level of protrusion of the front portion of the seat cushion 3", and by replacing the "reclining motor" with the "vertical motion motor". Then, the reclining motor 6, the seat sliding mechanism 9, and the vertical motion mechanism 10 can be configured so as to be actuated independently. However, it is preferable that the reclining motor 6, the seat sliding mechanism 9, and the vertical motion mechanism 10 be configured so as to be actuated according to a predetermined priority order in actions of the collision predicted state. In this time, if a second actuation mechanism, selected from the reclining mechanism 6, the seat sliding mechanism 9, and the front vertical mechanism 10, is actuated by a second driving means correspondingly selected from the reclining motor 12, the seat sliding motor 13, and the vertical motion motor 14, after a first actuation mechanism selected from the same above-described actuation mechanisms is actuated by a first driving means correspondingly selected from the same above-described driving means and completes an action, the second mechanism can be driven with use of much part of power supplied from the second power source, on some occasions, the first power source. Accordingly, the actuation mechanisms can be actuated at a high speed. On the other hand, in general, power required for actuating an actuation mechanism is highest at a start time of the actuation. Therefore, if a start time of a second actuation mechanism selected from the reclining mechanism 6, the seat sliding mechanism 9, and the front vertical mechanism 10 is made different from that of a first actuation mechanism selected from the same above-described mechanisms, a preferably high level of power can be supplied to each actuation mechanism.

An occupant protection apparatus according to another embodiments of the present invention will be explained.

In the embodiment described above, for explanatory purpose, an object to be actuated in an operation of the occupant protection apparatus was the reclining mechanism, the seat sliding mechanism, and the vertical motion mechanism of the seat 1. However, the range of the present invention is not limited. For example, every actuation mechanism of the vehicle that can be actuated when a collision is predicted, such as a side window, a sunroof, a movable headrest 4 of the seat 1, and a seat belt pretentioner, can be an object to be actuated.

In the embodiment described above, each mechanism of the seat 1 was explained as an object to be actuated in an operation of the occupant protection apparatus. In the embodiment, each mechanism of the seat 1 was explained to be controllable by the occupant through the operation switch 20 serving as an operation-inputting means. However, the range of the present invention is not limited. For example, an actuation mechanism 15 incontrollable by the occupant through an operation-inputting means and actuated only automatically in the collision predicted state, such as a seat belt pretentioner and a movable rollover bar both designed for protecting the occupant during a rollover, can be an object to be actuated.

In the embodiment described above, a configuration of a warning means was explained to include the alert display portion 31 for displaying alert. However, a specific configuration of a warning means is not limited. For example, a warning means can be configured from an alert buzzer for acoustically performing alert.

According to the embodiment of the present invention, when a collision is predicted for a vehicle equipped with a collision prediction function enabled by a radar or the like, a seat, a window, or the like, of the vehicle can be actuated at a high speed. The present invention can preferably be applied to an occupant protection apparatus for many kinds of a vehicle including an automobile.

According to an aspect of the present invention, an occupant protection apparatus for a vehicle includes a first power source means, a second power source means for supplying power of higher voltage than that of the first power source means, a collision-predicting means for predicting a collision, a driving means for driving an actuation mechanism of the vehicle on the basis of an output from the collision-predicting means, and a switching means for switching over from the first power source means to the second power source means for supplying power to the driving means when a collision is predicted to occur by the collision-predicting means.

According to the aspect of the present invention, when a collision is predicted to occur by the collision-predicting means, power of high voltage can be supplied to the driving means for driving the actuation mechanism of a vehicle such as a seat, a window, or the like. Accordingly, the actuation mechanism of a vehicle can be actuated at a high speed when a collision is predicted to occur. In addition, sufficient power can be supplied to another part of the vehicle in such a time when a collision is predicted to occur.

According to a further aspect of the present invention, an occupant protection apparatus for a vehicle includes a first power source means, a second power source means for supplying power of higher voltage than that of the first power source means, an operation-inputting means provided so as to be operable by an occupant, a collision-predicting means for predicting a collision, a driving means for driving an actuation mechanism of the vehicle on the basis of either one of an output from the operation-inputting means and an output from the collision-predicting means, and a switching means for selecting the first power source means to supply power to the driving means when an action command is input from the operation-inputting means and for switching over from the first power source means to the second power source means to supply power to the driving means when a collision is predicted to occur by the collision-predicting means.

According to the aspect of the present invention, power of an appropriate voltage can be supplied to the driving means when the action command is input by the operation-inputting means. Accordingly, the actuation mechanism of the vehicle such as a seat, a window, or the like, at an appropriate speed corresponding to the action command. In addition, power of high voltage can be supplied to the driving means when a collision of the vehicle is predicted to occur. Accordingly, the actuation mechanism of the vehicle can be actuated at a high speed. In addition, sufficient power can be supplied to another part of the vehicle in such a time when a collision is predicted to occur.

According to a further aspect of the present invention, the occupant protection apparatus for a vehicle includes a monitor means for monitoring a voltage of the second power source means. The switching means keeps supplying power from the first power source means to the driving means when an abnormal voltage is detected by the monitor means.

According to the aspect of the present invention, when a voltage of the second power source means is abnormal because of breakage or the like, the switching means does not switch to the second power source means, and keeps supplying power from the first power source means to the driving means. Accordingly, the actuation mechanism of the vehicle can be actuated firmly.

According to a further aspect of the present invention, the occupant protection apparatus for a vehicle includes a monitor means for monitoring a voltage of the second power source means and a warning means for warning an occupant of an abnormality when an abnormal voltage of the second power source means is detected by the monitor means.

According to the aspect of the present invention, the warning means warns an occupant of an abnormality when a voltage of the second power source is abnormal. Accordingly, even when the second power source means is not used in a normal state, a breakage or the like of the second power source means can be found immediately.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An occupant protection apparatus for a vehicle comprising:
   a first power source means;
   a second power source means for supplying power of higher voltage than that of the first power source means;
   a collision-predicting means for predicting a collision;
   a driving means for driving an actuation mechanism of the vehicle on the basis of an output from the collision-predicting means; and
   a switching means for switching over from the first power source means to the second power source means for supplying power to the driving means when a collision is predicted to occur by the collision-predicting means.

2. An occupant protection apparatus for a vehicle comprising:
   a first power source means;
   a second power source means for supplying power of higher voltage than that of the first power source means;
   an operation-inputting means provided so as to be operable by an occupant;
   a collision-predicting means for predicting a collision;
   a driving means for driving an actuation mechanism of the vehicle on the basis of either one of an output from the operation-inputting means and an output from the collision-predicting means; and
   a switching means for selecting the first power source means to supply power to the driving means when an action command is input from the operation-inputting means and for switching over from the first power source means to the second power source means to supply power to the driving means when a collision is predicted to occur by the collision-predicting means.

3. The occupant protection apparatus for a vehicle according to claim 1, further comprising:
a monitor means for monitoring a voltage of the second power source means, wherein the switching means keeps supplying power from the first power source means to the driving means when an abnormal voltage is detected by the monitor means.

4. The occupant protection apparatus for a vehicle according to claim 2, further comprising:
a monitor means for monitoring a voltage of the second power source means, wherein the switching means keeps supplying power from the first power source means to the driving means when an abnormal voltage is detected by the monitor means.

5. The occupant protection apparatus for a vehicle according to claim 1, further comprising:
a monitor means for monitoring a voltage of the second power source means; and
a warning means for warning an occupant of an abnormality when an abnormal voltage of the second power source means is detected by the monitor means.

6. The occupant protection apparatus for a vehicle according to claim 2, further comprising:
a monitor means for monitoring a voltage of the second power source means; and
a warning means for warning an occupant of an abnormality when an abnormal voltage of the second power source means is detected by the monitor means.

7. The occupant protection apparatus for a vehicle according to claim 3, further comprising:
a warning means for warning an occupant of an abnormality when the abnormal voltage of the second power source means is detected by the monitor means.

8. The occupant protection apparatus for a vehicle according to claim 4, further comprising:
a warning means for warning an occupant of an abnormality when the abnormal voltage of the second power source means is detected by the monitor means.

9. The occupant protection apparatus for a vehicle according to claim 1, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

10. The occupant protection apparatus for a vehicle according to claim 2, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

11. The occupant protection apparatus for a vehicle according to claim 3, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

12. The occupant protection apparatus for a vehicle according to claim 4, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

13. The occupant protection apparatus for a vehicle according to claim 5, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

14. The occupant protection apparatus for a vehicle according to claim 6, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

15. The occupant protection apparatus for a vehicle according to claim 7, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

16. The occupant protection apparatus for a vehicle according to claim 8, further comprising:
a second actuation mechanism provided at the vehicle, and
a second driving means for driving the second actuation mechanism, wherein
a start time of supplying power to the second actuation mechanism is different from a start time of supplying power to the actuation mechanism when power is supplied from the second power source means to the actuation mechanism and the second actuation mechanism.

17. The occupant protection apparatus for a vehicle according to claim 9, wherein an action of the second actuation mechanism is started after an action of the actuation mechanism is completed when power is supplied from the second power source means to the actuation mechanism and the second actuation mechanism.

18. The occupant protection apparatus for a vehicle according to claim 10, wherein an action of the second actuation mechanism is started after an action of the actuation mechanism is completed when power is supplied from the second power source means to the actuation mechanism and the second actuation mechanism.

19. The occupant protection apparatus for a vehicle according to claim 11, wherein an action of the second actuation mechanism is started after an action of the actuation mechanism is completed when power is supplied from the second power source means to the actuation mechanism and the second actuation mechanism.

20. The occupant protection apparatus for a vehicle according to claim 12, wherein an action of the second actuation mechanism is started after an action of the actuation mechanism is completed when power is supplied from the second power source means to the actuation mechanism and the second actuation mechanism.

* * * * *